June 21, 1932.   P. DELMAS   1,863,688
AUTOMATIC SIGNALING DEVICE FOR MOTOR VEHICLES
Filed Feb. 17, 1931   2 Sheets-Sheet 1
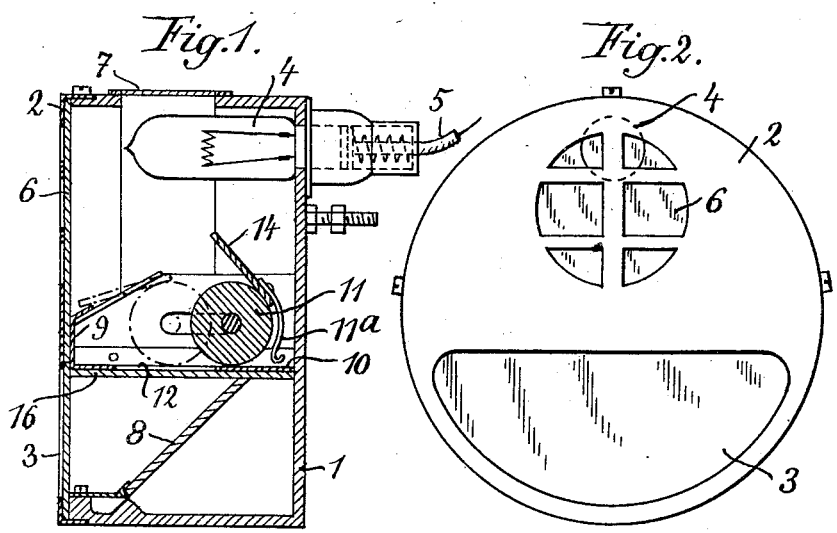
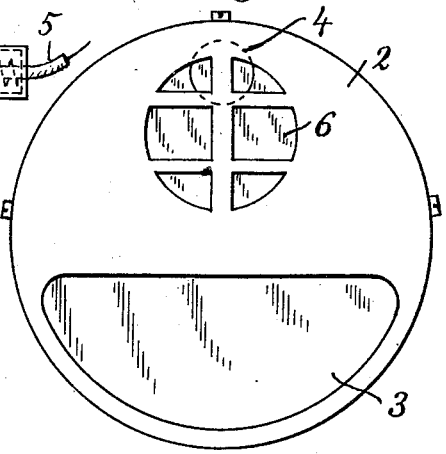
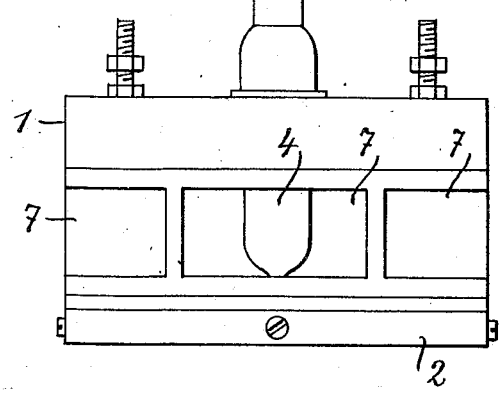
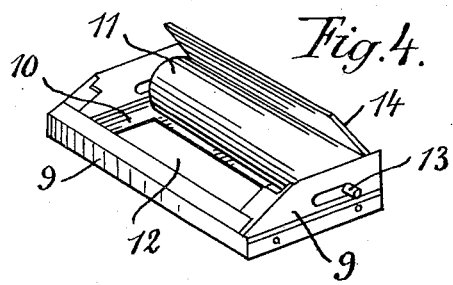
Inventor:
Pierre Delmas

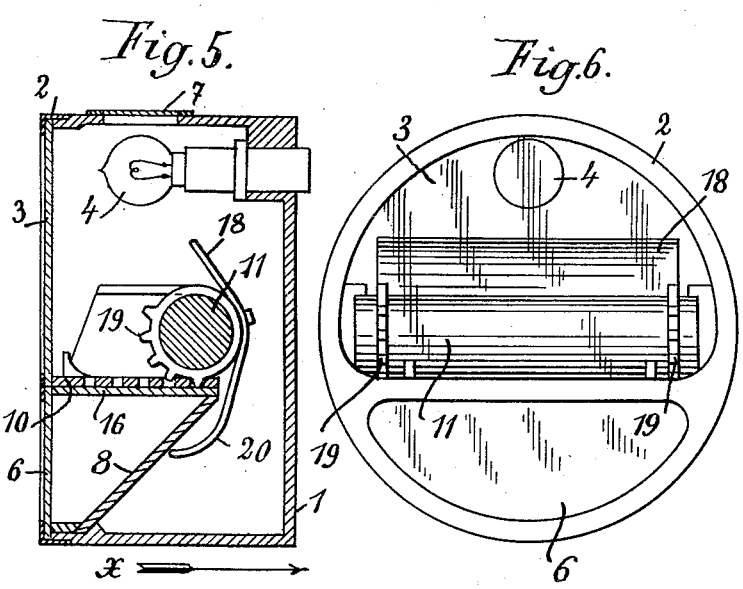

Patented June 21, 1932

1,863,688

UNITED STATES PATENT OFFICE

PIERRE DELMAS, OF PARIS, FRANCE

AUTOMATIC SIGNALING DEVICE FOR MOTOR VEHICLES

Application filed February 17, 1931, Serial No. 516,387, and in France February 18, 1930.

This invention relates to a signaling device which is especially applicable for use on motor-vehicles.

Said apparatus offers the advantage of uniting in one and the same set the rear light of the vehicle and a signaling device that takes action whenever the vehicle slows down or comes to a standstill, which device is adapted to permit of signaling both during day time by using daylight and at night by using any source of artificial light. My signaling device will operate automatically owing to the inertia of one of its component parts when the vehicle comes to a standstill or slows down and will resume its neutral position when the vehicle starts again or picks up speed.

The mobile element, the inertia of which actuates the signaling, is preferably a cylinder adapted to revolve in a horizontal or slightly slanting plane, and carrying a screen which, in one of the extreme positions of the cylinder, will intercept the light thrown by the signaling device, said light coming from an artificial source (which will then be the rear lamp of the vehicle), or being simply daylight as received by the device.

In order to make my invention more clearly understood, I have illustrated, as examples, two embodiments of the same in and by drawings appended hereto and wherein:

Fig. 1 is an axial vertical section;

Fig. 2 is a front view, and

Fig. 3 shows a plan view of a first embodiment;

Fig. 4 illustrates a detail;

Fig. 5 is an axial vertical section, while

Fig. 6 is a front view of the second embodiment;

Fig. 7 shows in vertical section the second position of the mobile element of the device.

According to the first embodiment shown, my device comprises a box 1 of suitable form, for instance, cylindrical in shape; said box carries a cover 2, which constitutes the circular rear face thereof, and is divided into two portions, the upper portion carrying the normal rear signal of the vehicle, while the lower portion carries a transparent glass 3 through which will appear the slow down and stop signal. Inside the upper portion of the box may be located any suitable source of artificial light, as, for instance, an electric lamp 4, one of the contacts of which is put to the mass while the other contact is connected with conductor wire 5. When daylight is not in use, this lamp will illuminate the normal rear signal of the vehicle, said signal being constituted by an opening provided through the cover and fitted with a transparent glass 6 tinted red. Transparent glass 6 and transparent glass 3 may form the two halves of one and the same glass. The side-wall of box 1 carries through its upper part a number of windows fitted with transparent glass or with mica 7 which windows can serve the twofold purpose of letting daylight penetrate into the device to illuminate the signaling arrangement when the lamp is not utilized, and of permitting the lamplight, when the lamp is lit, to pass out and illuminate the registration number of the vehicle, the plate bearing said number being then located above box 1.

The signaling device proper is located within the lower portion of box 1 and comprises essentially a mirror 8, set at 45°, above which is placed a device adapted to intercept light when the vehicle is running normally and to let said light through when the vehicle slows down or comes to a standstill. In the embodiment illustrated said device comprises a metal frame 9 including a horizontal base 10 on which a cylinder 11 is adapted to revolve. Base 10 is hollowed out so as to offer a window 12. Cylinder 11 has its ends fitted with spindles 13 which are guided in grooves provided in frame 9 and adapted to permit of suitably limiting the revolution of the cylinder so that the extreme positions of the latter will be properly determined. Moreover, the cylinder carries a lug 11a serving to limit the travel thereof and a screen 14, preferably made of some material elastic but offering a certain amount of rigidity, as, for instance, of a fairly thick sheet of india rubber. Frame 9 may be secured in the box by means of screws or of bolts. Below the frame is arranged a horizontal red glass 16 which may rest on rims integral with the box.

Operation is as follows:

During day time, lamp 4 is not utilized; it is, therefore, out and the normal rear signal 6 is not illuminated. Daylight penetrates into the device, however, through windows 7 but cannot, while the vehicle is running normally, reach the lower portion of the box, due to the interposition of screen 14 which comes to be placed above window 12 when cylinder 11 is in the extreme position indicated by dash-and-dot lines on Fig. 1, this being the case when the vehicle is running and moving at a regular pace in the direction shown by arrow $x$.

Whenever, the vehicle slows down or comes to a standstill, cylinder 11 is impelled forth by inertia, dragging screen 14 which uncovers window 12; light is then able to pass through red glass 16, to be reflected by mirror 6 and to pass out of the device through transparent glass 3, and so a red signal is shown indicating that the vehicle is slowing down or coming to a standstill. Either red glass 16 or glass 3 may, indeed, carry an inscription explanatory of the meaning of the signal. The frame may be slightly aslant towards glass 3, the effect thereof being to procure for the cylinder a preponderance over the closing of the shutter corresponding to the interception of light. At night, light comes from lamp 4 which is burning and acts as regards the signaling device exactly in the same manner as daylight. Said lamp furthermore illuminates the red glass 6 which constitutes the normal rear signal of the vehicle. Lastly, said lamp may, through windows 7, illuminate the number-plate of the vehicle.

According to the second embodiment illustrated by Figs. 5, 6 and 7, the cylinder 11, adapted to revolve on horizontal support 10, carries a metal sheet 18 the duty of which is to reflect downwards through red glass 16 what light comes to strike the device through the rear face thereof so that, when the cylinder is in the position shown by Fig. 5, the slow-down signal is always visible. In order to avoid that the cylinder might be thrown obliquely by a jerk, said cylinder has each of its ends provided with teeth 19 adapted to engage into corresponding notches made in support 10.

The metal sheet 18 has, behind the cylinder, an extension 20 slightly bent downwards so that, in the position shown by Fig. 5, said hind part passes behind cylinder 11 and 45°-set mirror 8, while in the off position (Fig. 7) it entirely covers glass 16 and completely intercepts light.

I claim:

1. A signaling device for motor vehicles and the like, comprising a casing, a reflector in said casing, means for illuminating said reflector, a transparent signaling sign arranged across the path of the reflected light beam, a cylinder arranged to travel in said casing above the reflector in the longitudinal direction of the vehicle, and a screen carried by said cylinder and normally held by the latter so as to obscure the reflector, said cylinder adapted, when moved by inertia on reduction of the speed of the vehicle, to remove the screen from the reflector.

2. A structure as claimed in claim 1 wherein the cylinder is fitted at the ends with spindles and is supported by means of said spindles in elongated slots in the walls of the casing.

3. The structure claimed in claim 1 in combination with a track in the casing for the cylinder, and teeth at the ends of the cylinder adapted to engage in notches in said track.

PIERRE DELMAS.